United States Patent [19]
Young

[11] Patent Number: 5,991,861
[45] Date of Patent: Nov. 23, 1999

[54] METHOD OF ENABLING AND DISABLING A DATA FUNCTION IN AN INTEGRATED CIRCUIT

[75] Inventor: B. Arlen Young, Palo Alto, Calif.

[73] Assignee: Adaptec, Inc., Milpitas, Calif.

[21] Appl. No.: 08/617,991

[22] Filed: Mar. 15, 1996

[51] Int. Cl.[6] .................................................. G06F 12/02
[52] U.S. Cl. ........................ 711/202; 711/154; 395/306; 395/307; 395/308; 395/309
[58] Field of Search .................... 395/308, 309, 395/311, 312, 412, 427, 481, 490, 282, 858, 306, 307; 711/202, 154, 112; 371/40.14, 40.12

[56] References Cited

U.S. PATENT DOCUMENTS

| | | | |
|---|---|---|---|
| 4,373,181 | 2/1983 | Chisholm et al. | 395/421.01 |
| 4,468,759 | 8/1984 | Kung et al. | 365/201 |
| 4,965,801 | 10/1990 | DuLac | 371/40.14 |
| 5,033,048 | 7/1991 | Pierce et al. | 371/21.2 |
| 5,070,502 | 12/1991 | Supnik | 395/182.06 |
| 5,131,082 | 7/1992 | Bonevento et al. | 395/825 |
| 5,251,312 | 10/1993 | Sodos | 395/844 |
| 5,278,969 | 1/1994 | Pashan et al. | 395/182.04 |
| 5,293,624 | 3/1994 | Andrade et al. | 395/825 |
| 5,373,512 | 12/1994 | Brady | 371/40.12 |
| 5,436,912 | 7/1995 | Lustig | 371/21.2 |
| 5,475,814 | 12/1995 | Tomimitsu | 395/183.06 |
| 5,553,260 | 9/1996 | Miyane | 711/220 |
| 5,555,390 | 9/1996 | Judd et al. | 711/112 |
| 5,561,772 | 10/1996 | Dornier et al. | 395/309 |
| 5,586,268 | 12/1996 | Chen et al. | 395/858 |
| 5,611,057 | 3/1997 | Pecone et al. | 395/282 |
| 5,615,383 | 3/1997 | Caudel et al. | 395/309 |

*Primary Examiner*—Eddie P. Chan
*Assistant Examiner*—T. V. Nguyen
*Attorney, Agent, or Firm*—Forrest Gunnison

[57] ABSTRACT

The address used to specify the storage location of data streaming from a first device to a second device is used in the control of a data function, such as an XOR function circuit in an integrated PCI buffer controller and data function circuit. An alias PCI address is loaded in a SCSI command block for the data destination when the data function circuitry is to be enabled. A host adapter system driver or application is notified of an alias address during initialization, and uses the alias address in the construction of SCSI command blocks to specify that the data shall be operated upon by the data function. When no data operation is desired, the normal (non-alias) address is specified in the SCSI command block. Thus, for every address for the device, there is a corresponding alias address which not only addresses the same location, but also turns on the data function. In effect, two devices are defined in the address space corresponding to the two modes of operation.

14 Claims, 7 Drawing Sheets

METHOD OF ENABLING AND DISABLING A DATA FUNCTION IN AN INTEGRATED CIRCUIT

RELATED APPLICATIONS

This application is related to the following copending, commonly filed, and commonly assigned U.S. patent applications:

1. U.S. patent application Ser. No. 08/617,993, entitled "AN INTEGRATED PCI BUFFER CONTROLLER AND XOR FUNCTION CIRCUIT," of B. Arlen Young, filed on Mar. 15, 1996 as Attorney Docket No. M-3805 US;
2. U.S. patent application Ser. No. 08/615,478, entitled "A HARDWARE METHOD FOR VERIFYING THAT AN AREA MEMORY HAS ONLY ZERO VALUES," of B. Arlen Young, filed on Mar. 15, 1996 as Attorney Docket No. M-3921 US; and
3. U.S. patent application Ser. No. 08/615,477, entitled "A HOST ADAPTER SYSTEM INCLUDING AN INTEGRATED PCI BUFFER CONTROLLER AND XOR FUNCTION CIRCUIT," of B. Arlen Young, filed on Mar. 15, 1996 as Attorney Docket No. M-3920 US.

Each of the above applications is incorporated herein by reference in its entirety.

BACKGROUND OF THE INVENTION

1. Field of the Invention

The present invention is related generally to host adapter systems that control transfer of data between two buses, and more specifically to an integrated circuit and system for RAID applications that includes a hardware data function.

2. Description of Related Art

The Small Computer System Interface (SCSI) standard, which is specified by the American National Standards Institute (ANSI X3.131-1986, which is incorporated herein by reference in its entirety) of 1430 Broadway, New York, N.Y. 10018, is an example of an industry-recognized standard for a relatively complex local area network. Descriptions of the SCSI bus may be found for example in U.S. Pat. No. 4,864,291 "SCSI Converter" issued Sep. 5, 1989 to J. E. Korpi and in U.S. Pat. No. 4,905,184 "Address Control System for Segmented Buffer Memory" issued Feb. 27, 1990, to R. P. Giridhar, et al., which are incorporated herein by reference in their entirety.

A typical SCSI system 100 is illustrated in FIG. 1. A plurality of intelligent devices 120, 140, 141, 142 are coupled to SCSI bus 110 so that these devices can exchange information. The intelligent devices are (i) a first host system 120, whose internal structure is shown in detail, that includes host adapter system 160 (ii) a second host system 140, whose internal structure is similar to that shown for system 120, (iii) a first SCSI disk drive unit (Target-A) 141, and (iv) a second SCSI disk drive unit (Target-B) 142. The host adapter system in a host computer can be either a single integrated circuit, or a plug-in board. In each case, the host adapter system, hereinafter host adapter, transfers data between a host computer bus, e.g., an ISA bus, an EISA bus, a VME bus, or a PCI bus, and a SCSI bus.

Typically, a software driver, executing on CPU 121 of host computer 120, builds and sends a command block to the host adapter. Each command block specifies exactly how a SCSI command is to be executed. Host adapter 160 executes the command block, and interrupts host computer 120 to report completion of the execution. Herein, execution of a command block means performance of the SCSI command contained in the command block. Consequently, host computer 120 is interrupted at least once for every command block.

The architecture in FIG. 1 is typical of that used to interface a single SCSI bus to a host computer bus. While this configuration can be used for RAID applications, a RAID 5 configuration requires manipulation of data to create redundancy for fault tolerance and to use the redundancy to recover data lost because of a fault. Data manipulation by software is notoriously slow, and uses significant host CPU time.

In another configuration, multiple host adapters, e.g., multiple host adapters 160, are sometimes used in RAID 5 applications. However, such a configuration does not alleviate the problems associated with manipulation of data with software processes, and does not alleviate the load on either host computer bus 126 or host computer microprocessor 121. Consequently, the performance of RAID 5 structures is limited by the performance of data manipulation using software.

SUMMARY OF THE INVENTION

An integrated buffer controller and data function circuit of this invention includes a data function circuit that is controlled by addresses supplied to the circuit. The integrated buffer controller and data function circuit has a bus interface that is used to connect the circuit to a bus on which one or more host adapters are connected so that both the host adapters and a host computer can transfer data to and from the circuit, and supply addresses to control operation of this data function circuit.

In one embodiment, the integrated buffer controller and data function circuit includes an address decode circuit that receives an address applied to the integrated buffer controller and data function circuit. The address circuit generates an active signal on a data function enable output line when the applied address is in an alias address space, a second address space, and an inactive signal when the applied address is in a normal address space, a first address space.

A data channel in the integrated buffer controller and data function circuit connects the bus interface to a buffer memory controller. The buffer memory controller has a buffer memory port that includes a data port, a memory address port, and a memory control port. A buffer memory is connected to the buffer memory port.

A data function circuit in the buffer memory controller is coupled to the data function enable output line. The data function circuit is selectively connected to the data port.

Specifically, in response to an inactive signal on the data function enable output line, the memory controller circuit couples the second end of the data channel to the data port. However, in response to an active signal on the data function enable output line, the buffer memory controller couples the output from the data function circuit to the data port. In one embodiment, the data channel is a slave data channel.

The integrated buffer controller and data function circuit also includes a master data channel connecting the bus interface to the memory controller. The master data channel includes a DMA controller connected to the bus interface, and a master first-in-first-out memory circuit connected between the DMA controller and the buffer memory controller.

A sequencer in the integrated buffer controller and data function circuit is connected to the buffer memory controller and to the DMA controller. The sequencer is also connected to a control block memory port of the integrated buffer controller function circuit. The sequencer executes SCSI command blocks so that the integrated buffer controller and data function circuit appears to the host computer as a host adapter that in turn communicates with a SCSI target. This allows the driver for the other host adapters to communicate with the integrated buffer controller and data function circuit without modification, because the driver does not know that the integrated buffer controller and data function circuit is not connected to a SCSI bus.

In one embodiment, the slave channel automatically transfers data between the bus connected to the bus interface circuit and the buffer memory. Thus, the integrated buffer controller and data function circuit appears to other host adapters as a host buffer memory.

The data function circuit of integrated buffer controller and data function circuit is useful for RAID parity generation. For RAID 5 applications, the data function is the XOR function.

According to the principles of this invention, the address used to specify the storage location of the data streaming from a first device to a second device is used in the control of a data function, such as the XOR function circuit in the integrated PCI buffer controller and data function circuit. In this embodiment, the address for the data transfer is used by the address decode circuit to generate an active data function enable signal to the data function in the buffer controller. Specifically, an alias PCI address is loaded in the SCSI command block for the data destination in the buffer memory when the data function circuitry is to be enabled. The host adapter system driver or application is notified of the alias address during initialization, and uses the alias address in the construction of SCSI command blocks to specify that the data shall be operated upon by the data function. When no data operation is desired, the normal (non-alias) address is specified in the SCSI command block.

Thus, for every buffer address of the buffer memory, there is a corresponding alias address which not only addresses the same buffer location, but also turns on the data function. Thus, the buffer memory controller operates in one of two modes, a direct mode and a data function mode. In the first mode, i.e., the direct mode, data are read directly from or written directly to the buffer memory. In the first mode, the normal addresses for the buffer memory are given in the SCSI command block.

In the second mode, a data function mode, e.g., an Exclusive OR (XOR) function in this embodiment, is performed on data written to the buffer memory. In the second mode, the alias address for the buffer memory is given in the SCSI command block. Thus, an image of the buffer memory address interval is allocated in the address space for buffer memory accesses via the data function mode.

In effect, two devices are defined in the address space corresponding to the two modes of operation. A consequence of this mode selection method is that the address allocation required for the buffer memory in the address space is twice the actual size of the memory.

Hence, a novel method of this invention uses addressing for managing a host adapter data function that operates on a data stream. The method requires no additional control signals and no modification to other host adapter hardware or firmware. Data function management is automatic during data transfer, and adds no time to command execution and data transfer.

According to the principles of this method, the host adapter or other device is assigned two address spaces, a normal address space and an alias address space. In the method of this invention for enabling and disabling a data function in a circuit, one of a first address in a first set of addresses for the circuit, and a second address in second set of address for the circuit is applied to the circuit. The data function in the circuit is disabled in response to the first address being applied to the circuit. Conversely, the data function in the circuit is enabled in response to the second address being applied to the circuit. The first set of addresses define a first address space for the circuit, and the second set of address define a second addresses space for the circuit.

A host adapter system of this invention includes a secondary computer bus, a plurality of I/O buses, and a plurality of host adapter circuits. Each host adapter circuit is connected to the secondary computer bus and to one I/O bus in the plurality of I/O buses. An integrated buffer controller and data function circuit is connected to the secondary computer bus and an external buffer memory. The external buffer memory appears to the plurality of host adapter circuits as a host computer buffer memory.

A method for verifying that an area of memory is zero utilizing only hardware is another invention that facilitates use of the integrated buffer controller and data function circuit in RAID applications. In this method, a logic zero value is loaded in a storage element. A unit of data is retrieved from the area of memory being tested for a logic zero value. The logic zero value and retrieved unit of data are applied as input signals to a logic hardware circuit that has a unique output signal for two logic zero input signals. If the output signal from the logic hardware circuit is not equal to the unique output signal, a status flag is set. So long as the output signal from the logic hardware circuit is the unique value, the retrieving, applying and setting operations are repeated until all data in the area of memory has been processed. If other than the unique output signal is detected, the method can be stopped and the address to the non-zero value determined, or alternatively, the number of units of data processed before the error was detected can be determined.

DETAILED DESCRIPTION

According to the principles of this invention, an integrated PCI buffer controller and Exclusive OR (XOR)

function circuit 265 performs data manipulation using dedicated hardware and so eliminates performance degradations associated with software data manipulation to implement a data function. Further, utilization of the data function circuit, e.g., the XOR function circuit, does not require any hardware modifications to existing host adapters, and does not add time to SCSI command execution, or affect the execution of SCSI commands.

Integrated PCI buffer controller and XOR function circuit 265 includes hardware circuitry to perform all data manipulation required for RAID 5 applications, a bus interface circuit, a master data channel that includes a DMA engine, a slave data channel, a buffer memory controller, and a RISC sequencer. Specifically, the data manipulation required for RAID 5 applications is provided by a hardware XOR function circuit within circuit 265.

In one embodiment, the XOR function circuit uses a buffer memory 245 for storing one of the two XOR operands, and for storing the result of the XOR operation. Buffer memory 245 can also be used for caching RAID 5 parity information, which often saves SCSI target read operations. Data can also be cached or buffered in buffer memory 245. The amount of caching and buffering depends primarily on the size of buffer memory 245. Buffer memory 245 is typically dynamic random access memory (DRAM) that is between 1 and 16 Mbytes in size.

Figure 1:
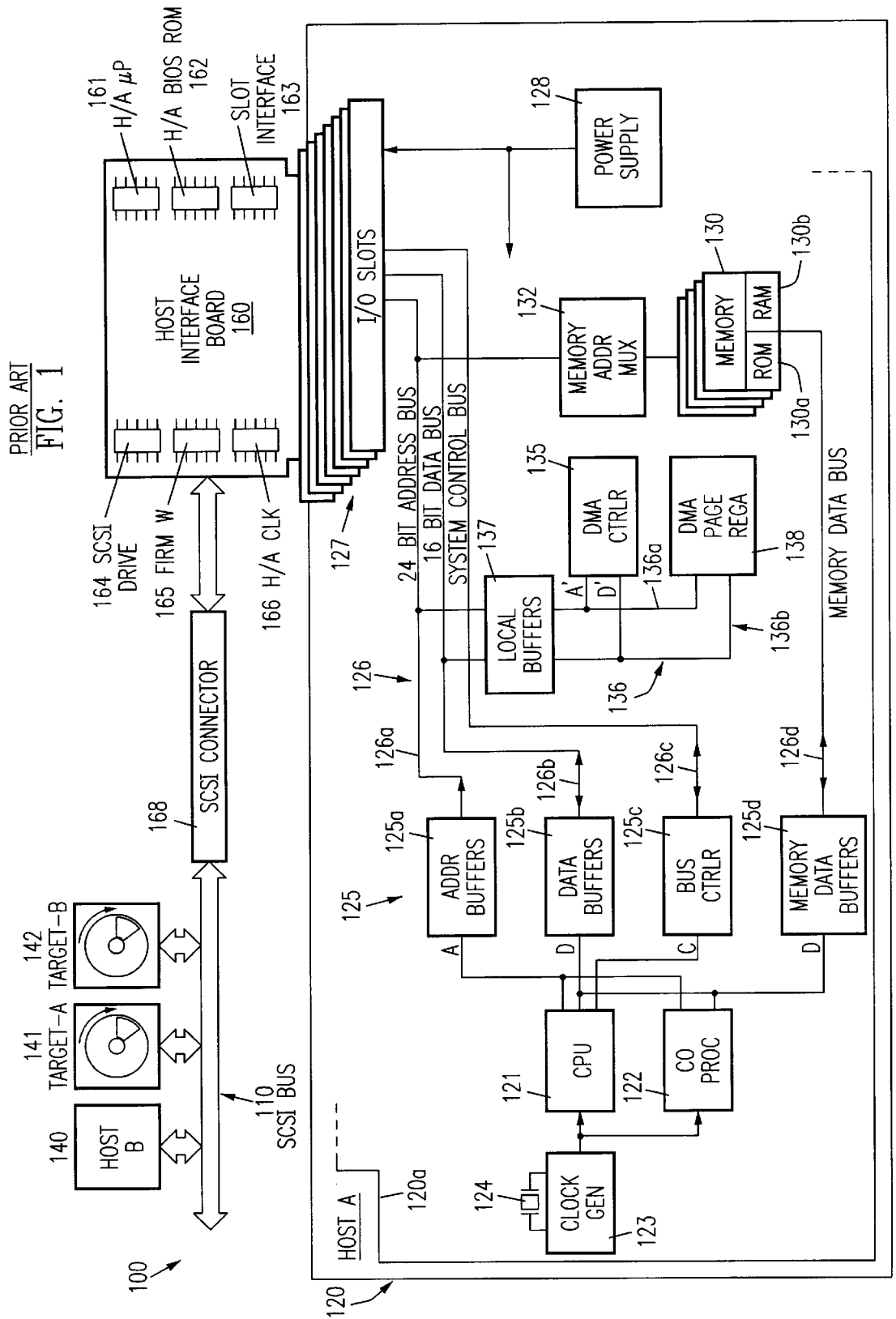
FIG. 1 is an illustration of a typical prior art SCSI system 100 that included host adapter system 160.
Figure 2A:
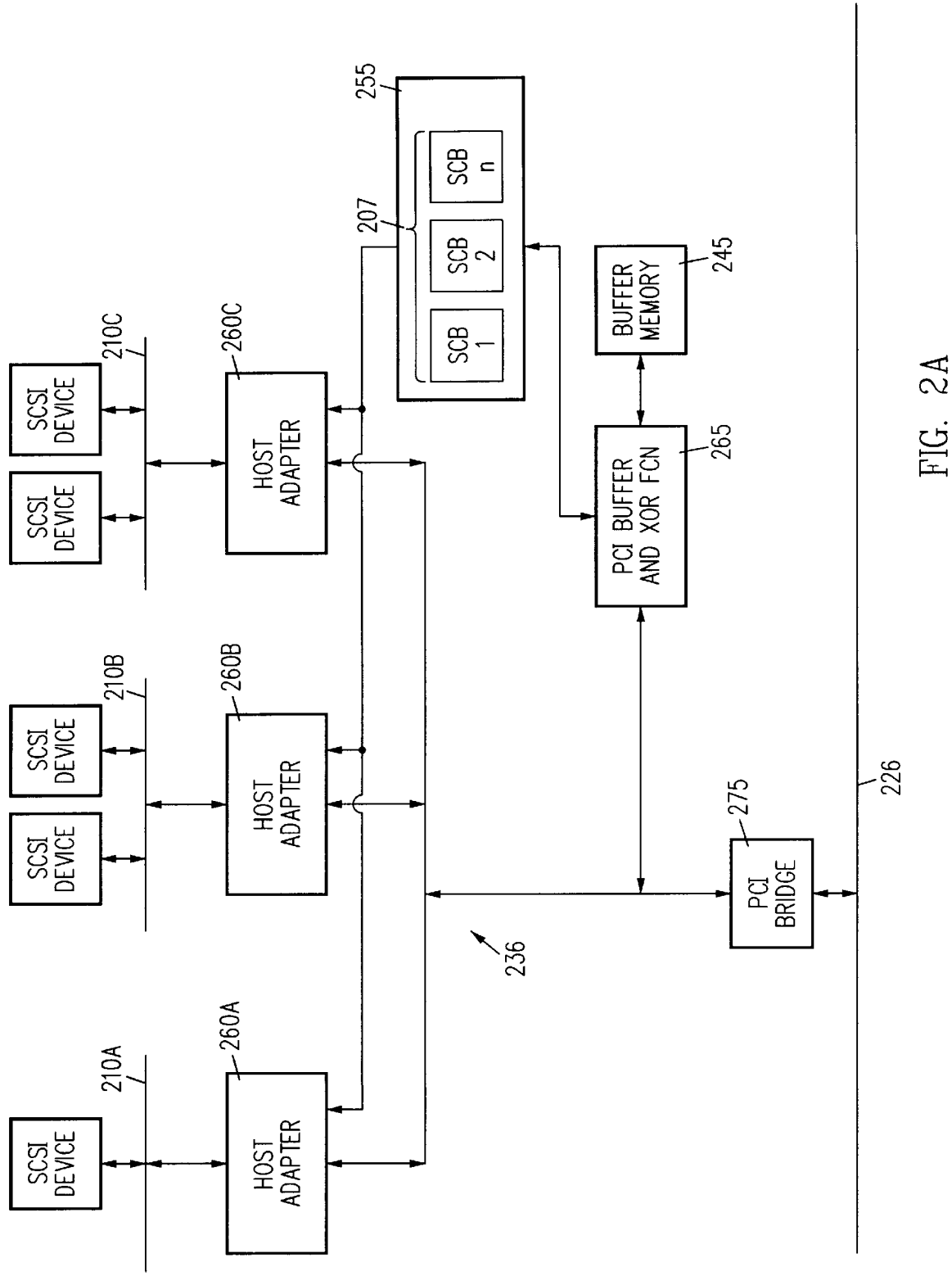
FIG. 2A is an illustration of a host adapter system with the integrated buffer controller and XOR function circuit of this invention and a plurality of host adapters.

In the embodiment of FIG. 2, integrated PCI buffer controller and XOR function circuit 265 and a plurality of host adapters, e.g., host adapters 260A to 260C, are connected to a secondary PCI bus 236 that in turn is connected to a PCI bus bridge 275.

Figure 2B:
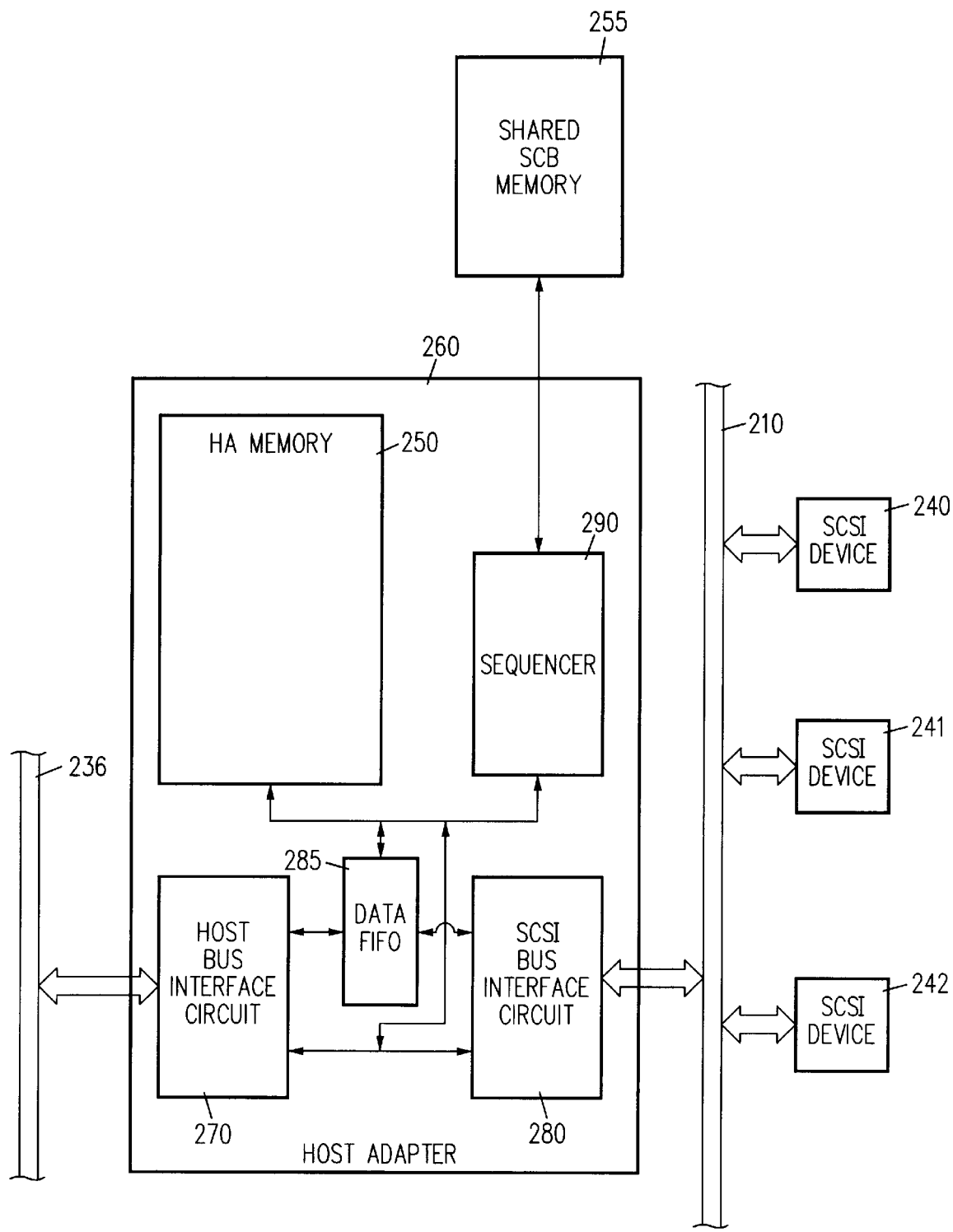
FIG. 2B is a block diagram of a typical configuration for a prior art host adapter circuit.

The basic structure of each of host adapters 260A to 260C is illustrated in FIG. 2B. The components include a PCI bus interface circuit 270, a SCSI bus interface circuit 280, a data first-in-first-out (FIFO) memory circuit 285 and a RISC sequencer 290. Each of host adapters 260A to 260C also includes a bus master data channel for DMA transfer of data directly between the SCSI bus and a buffer memory, that was previously the host buffer memory.

In one embodiment, host adapters 260A to 260C are each a PCI/SCSI host adapter such as the Adaptec AIC-7870 host adapter, available from Adaptec, Inc. of Milpitas, Calif. In this embodiment, the PCI bus interface circuit, DMA logic, the bus master data channel, and RISC processor in integrated PCI buffer controller and XOR function integrated circuit 265 are the same hardware as in the Adaptec AIC-7870 host adapter.

PCI bus bridge 275 selectively connects and disconnects secondary PCI bus 236 to host computer PCI bus 226, a first PCI bus. As is known to those of skill in the art, PCI bus bridge 275 is necessary to provide a proper load for host computer PCI bus 226. When PCI bus bridge 275 disconnects host adapters 260A to 260C from PCI bus 226, host adapters 260A to 260C can transmit data to, and receive data from buffer memory 245 over secondary PCI bus 236 through PCI buffer controller and XOR function circuit 265. Thus, host computer PCI bus 226 and secondary PCI bus 236 operate independently whenever possible. PCI bus bridge 275 includes bus mastering capability on both host computer PCI bus 226 and secondary PCI bus 236.

PCI bus bridge 275, in this embodiment, operates as a concurrent bridge. The bridge data channel has a write-posting buffer and a read pre-fetch buffer on the host computer PCI side, and also another write-posting buffer and a read pre-fetch buffer on the secondary PCI side. PCI bus bridge 275 supports one transaction posting. The write-posting buffers accept write data from one bus and acknowledge reception to that bus. PCI bus bridge 275 temporarily stores, e.g., posts, the write data until the data can be written on the other bus. The read pre-fetch buffers take the address from a single read access and read additional data speculating that the additional data are needed. PCI bus bridge 275 holds the data in a buffer until the data are either unusable, or are used by a read access.

As explained more completely below, to facilitate such data transfers a PCI master data channel and a slave data channel are provided between buffer memory 245 and PCI bus 236, enabling high-speed data transfers between buffer memory 245 and host computer PCI bus 226, and between buffer memory 245 and a SCSI device connected to any one of host adapters 260A to 260C.

In one embodiment, firmware in circuit 265 for the RISC sequencer includes instructions so that circuit 265 responds to the basic SCSI commands, such as Read, Write, Read Capacity, Test Unit Ready, and Request Sense Status. Data transfers between the host computer and buffer memory 245 are initiated by a driver executing on the host computer sending a SCSI command block to circuit 265 requesting a SCSI Read or Write command. The SCSI CDB contained within the SCSI command block contains the logical byte address of buffer memory 245, and the direction for data flow.

In addition, as explained more completely, the RISC sequencer also responds to vendor unique SCSI commands. In one embodiment, two vendor unique SCSI commands have been implemented in the RISC sequencer firmware to take advantage of special circuitry within circuit 265 to rapidly zero out a segment of buffer memory 245, or to check a segment of memory 245 for all zeros. Both functions are of value in performing RAID 5 operations, as explained more completely below.

The fastest mode for transferring data between a host buffer memory and buffer memory 245 is the PCI master mode. A DMA controller is included in PCI master data channel of integrated buffer controller and XOR function circuit 265 for use in PCI master mode.

As explained more completely below, the slave data channel in integrated PCI buffer controller and XOR function circuit 265 allows host adapters 260A to 260C, to do a DMA data transfer between a SCSI target and buffer memory 245. The selection of one of the host buffer computer memory and buffer memory 245 for the DMA transfer from the SCSI target is made via the PCI address conveyed in the SCSI command block for the host adapter. The host adapter executing the SCSI command block has no need to know whether the data buffer is in the host computer or connected to integrated PCI buffer controller and XOR function circuit 265.

Figure 3:
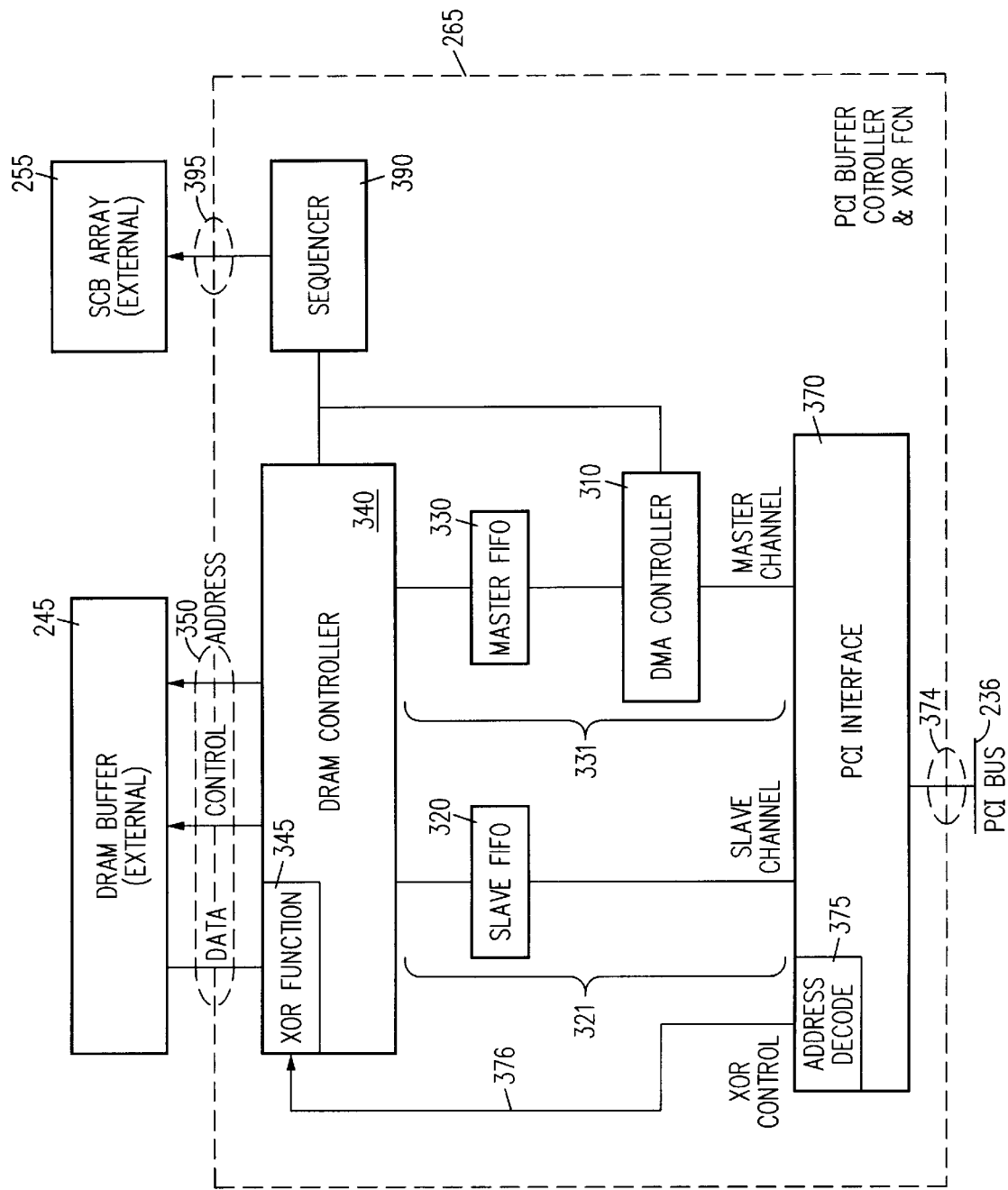
FIG. 3 is a block diagram of the integrated buffer controller and XOR function circuit of this invention.

FIG. 3 is a more detailed block diagram of integrated PCI buffer controller and XOR function circuit 265. In this embodiment, an external bus port 374 of a PCI bus interface circuit 370 is connected to secondary PCI bus 236. PCI bus interface circuit 370 connects external bus port 374 to the other circuits within integrated PCI buffer controller and XOR function circuit 265.

The circuits within PCI bus interface circuit 370 perform the PCI bus protocol for data transfers to and from PCI bus 236. For slave data channel transfers with one of host adapters 260A to 260C as the master, PCI bus interface circuit 370 recognizes PCI addresses within the address range for integrated PCI buffer controller and XOR function circuit 265, and passes data from a PCI bus 236 to a first end of a slave data channel 321. For master data channel transfers, PCI bus interface circuit 370 generates the PCI address, as provided over master data channel 331 by DMA controller 310.

In addition, PCI bus interface circuit 370 contains an address decoder 375 which provides the enable control signal over data function enable line 376 for hardware XOR function circuit 345 that in this embodiment is included within buffer memory controller 340. As explained more completely below, address decoder 375 receives the PCI address from PCI bus 236 and generates an inactive signal on data function enable line 376 for a first set of addresses and an active signal on data function enable line 376 for a second set of addresses that is different from the first set.

Slave data channel 321 connects PCI bus interface circuit 350 to a slave first-in-first out memory circuit 320, hereinafter slave FIFO 320, that in turn is connected to a slave data channel interface of buffer memory controller 340. Slave data channel 321 operates automatically without control by RISC sequencer 390.

DMA controller 310 manages master data channel transfers at the PCI end of a master first-in-first-out memory circuit 330, hereinafter master FIFO 330. For a PCI master mode transfer, DMA controller 310 is configured by sequencer 390 with the PCI address of the data, the number of bytes to be transferred, and the data flow direction. DMA controller 310 is monitored by sequencer 390 for the end of the data transfer.

Master FIFO 330 and slave FIFO 320 provide data rate matching between PCI bus 236 and buffer memory 245 for master data channel 331 and slave data channel 321, respectively. Master FIFO 330 is typically 64 or 128 bytes deep, and slave FIFO 320 is typically 256 bytes deep.

As indicated above, sequencer 390 is the same as that found in host adapters 260A to 260C, in this embodiment. Sequencer 390 accesses SCSI command blocks stored in an external shared memory 255 through an external SCB memory port 395. As is known to those of skill in the art, the host adapter system driver uses a PIO data transfer to load the SCSI command block into a SCB array in external shared memory 255 through the external SCB memory port 395 of integrated PCI buffer controller and XOR function circuit 265.

After the SCSI command block is loaded in the SCB array, the host adapter system driver loads a pointer to the SCSI command block in a queue-in FIFO of sequencer 390. When the pointer is loaded, a queue-in counter is automatically incremented to indicate to sequencer 390 that a SCSI command block is available for processing by sequencer 390.

For a data transfer command from, or to host computer buffer memory in a SCSI command block, sequencer 390 configures and manages DMA controller 310 and buffer memory controller 340 for a PCI master mode data transfer. Thus, in FIG. 3, sequencer 390 is shown as connected to both DMA controller 310 and buffer memory controller 340. For special functions, such as writing zeros to buffer memory 245 or checking buffer memory 245 for zeros, sequencer 390 manages buffer memory controller 340 only. Normally, sequencer 390 interacts only with master data channel 331, and not slave data channel 321. Slave data channel 321 operates automatically and independently from master data channel 331.

Sequencer 390 emulates a SCSI target by interpreting certain SCSI CDBs and providing an appropriate response back to the host computer.

As described above, the SCB array in shared external memory 255 stores SCSI command blocks received from the host adapter system driver executing on the host computer. Each SCSI command block has 32 bytes, and shared memory 255 can store 256 blocks.

Buffer memory controller 340 is the interface between both slave data channel 321 and master data channel 331 and buffer memory port 350 that is connected to buffer memory 245. In this embodiment, buffer memory port 350 includes a memory data bus port, a memory address port, and a memory control port. Buffer memory controller 340 generates addressing signals over memory address port and control signals over memory control port that are required by buffer memory 245. In addition, buffer memory controller 340 selects the data path through controller 340 to buffer memory 245. Buffer memory controller 340 also contains hardware to implement special functions that zero buffer memory segments or check buffer memory segments for all zeros.

The initial buffer memory address for master data channel transfers is loaded into buffer memory controller 340 by sequencer 390, along with the total number of bytes to be transferred. Buffer memory controller 340 manages the address during the data transfer, and stops the transfer after the specified number of bytes have been transferred.

The initial buffer address for slave data channel transfers is provided to buffer memory controller 340 by PCI bus interface circuit 370. Buffer memory controller 340 increments the address as bytes are transferred to or from buffer memory 245. Buffer memory controller 340, in this embodiment, does not provide byte count management for data transfers over slave data channel 321. Both master data channel 331 and slave data channel 321 can be transferring data concurrently. Since there is only one data path to buffer memory 245, buffer memory controller 340 time-multiplexes between the two data channels.

Buffer memory controller 340 provides all control signals to buffer memory 245. The control signals include the read and write strobes. Control signals are sequenced by buffer memory controller 340 to provide simple memory reads and writes, DRAM refresh, and sequences required by the XOR function circuit 345.

Hardware XOR function circuit 345 generates an Exclusive OR function of data flowing toward buffer memory 245 with the data already stored in buffer memory 245. The data can flow from either master data channel 331 or slave data channel 321. Data are read from buffer memory 245 by buffer memory controller 340, and the read data are a first input to XOR function circuit 345. The incoming data are a second input to XOR function circuit 345. XOR function circuit 345 generates the Exclusive OR function of the input data, and the result is stored back at the same buffer memory location, in one embodiment. In another embodiment, the Exclusive OR circuit output data are written to another location in buffer memory 245 so that the original data in buffer memory 245 is preserved, i.e., cached. Data flowing from buffer memory 245 to either master data channel 331 or slave data channel 321 is passed through buffer memory controller 340 unaltered.

The XOR Function is enabled or disabled via an XOR control signal that is generated by address decode circuit 375 on line 376. As explained more completely below, a PCI address determines whether XOR function circuit 345 is enabled.

The method used on integrated PCI buffer controller and XOR function circuit 265 to enable XOR function circuit 345 is a novel technique that can be used for a wide variety of functions other than the XOR function that is used herein as an example. SCSI host adapters, such as host adapters 260A to 260C, basically perform just one service, transfer of data between the SCSI bus and a host bus. This service may be augmented with functions such as caching and data compression, which are often managed by a processor onboard the host adapter using software. These functions, referred to below as "data functions", operate on data to alter the data according to some process, or to combine the data with other data to create new data.

In integrated PCI buffer controller and XOR function circuit 265, the onboard hardware XOR function circuit 345 combines data stored in buffer memory 245 with data streaming from either the SCSI bus or host computer PCI bus 226. The two data operands are XORed together, and the result replaces the operand retrieved from buffer memory 245. The XOR function is executed while the data are streaming, and does not hinder either the streaming of data, or the execution of the data transfer command. In other words, the function does not add delays or additional overhead to the command execution. The hardware data management function is implemented with a minimum of hardware and firmware such that its hardware is fully compatible with existing host adapter hardware.

According to the principles of this invention, the address used to specify the storage location of the data streaming from a first device to a second device is used in the control of a data function, such as the XOR function circuit on integrated PCI buffer controller and XOR function circuit 265. In this embodiment, a PCI address for the data transfer is used by address decode circuit 375 to generate an active XOR control signal to XOR function circuit 345 on line 376. Specifically, an alias PCI address is loaded in the SCSI command block for the data destination in buffer memory 245 when the data function circuitry is to be enabled. The host adapter system driver or application is notified of the alias address during initialization, and uses the alias address in the construction of SCSI command blocks to specify that the data shall be operated upon by the data function. When no data operation is desired, the normal (non-alias) address is specified in the SCSI command block.

Thus, for every buffer address of buffer memory 245, there is a corresponding alias address which addresses the same buffer location, but also turns on the data function. Thus, buffer memory controller 340 operates in one of two modes, a direct mode and a data function mode. In the first mode, i.e., the direct mode, data are read directly from or written directly to buffer memory 245. In the first mode, the normal PCI addresses for buffer memory 245 are given in the SCSI command block.

In the second mode, a data function, e.g., an Exclusive OR function in this embodiment, is performed on data written to buffer memory 245. In the second mode, the alias PCI address for buffer memory 245 is given in the SCSI command block. Thus, an image of the buffer memory PCI address interval is allocated in PCI address space for buffer memory accesses via the data function mode.

In effect, two PCI devices are defined in the address space corresponding to the two modes of operation. A consequence of this mode selection method is that the address allocation required for buffer memory 245 in the PCI address space is twice the actual size of the memory. This is not considered important however because the size of the PCI address space used is small compared to the total PCI address space.

Figure 4:
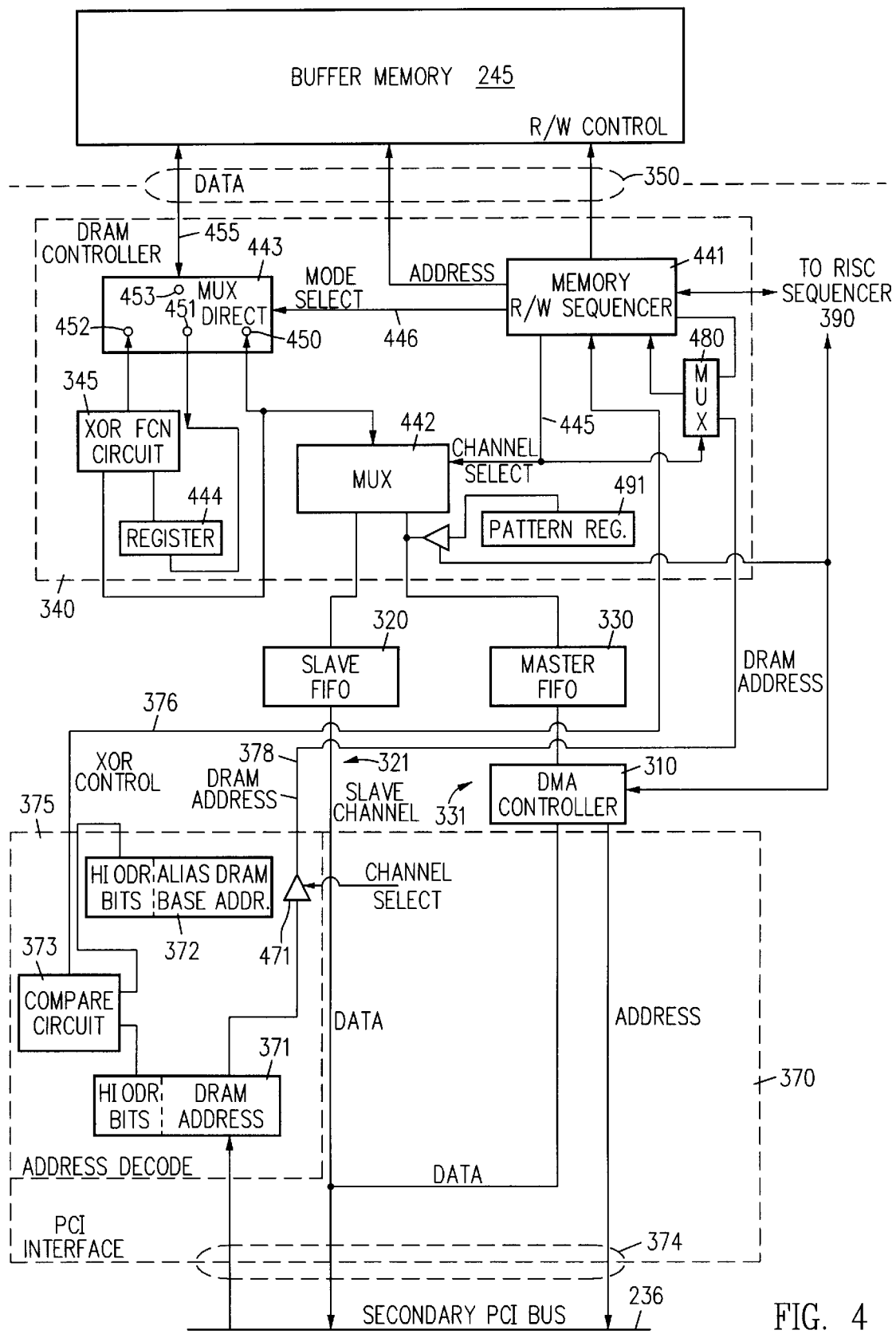
FIG. 4 is a more detailed diagram of one embodiment of the address decode circuit and the buffer memory controller in the integrated buffer controller and XOR function circuit of this invention.

FIG. 4 is a more detailed block diagram of address decode circuit 375 and buffer memory controller 340. In FIG. 4, data and address lines from PCI bus 236 are shown going directly through PCI bus interface circuit 370. Also, multiple address connections are shown to PCI bus 236. This is illustrative only. As understood by those of skill in the art, PCI bus interface circuit 370 includes all circuitry necessary to obtain conformity with the PCI bus specification. However, for an understanding of the novel features of this invention, the particular operations performed by PCI bus interface circuit 370 are not of importance.

Further, the use of a PCI bus is illustrative only. In view of this disclosure, those of skill in the art can use the principles of this invention with any of the computer buses found in a host computer.

In either a direct master mode, or direct slave mode transfer, RISC sequencer 390 configures memory read/write sequencer 441 for a direct operation. Memory read/write sequencer 441 generates a signal on mode select line 446 to multiplexer 443 so that buffer memory data bus port 455 to memory buffer 245 is connected to direct bus terminals 450, which in turn are connected to multiplexer 442. As indicated above, multiplexer 442 is used by memory read/write sequencer 441 to time multiplex the access to buffer memory 245 between slave data channel 321 and master data channel 331. Accordingly, the channel select signal on line 495 connects the data bus from buffer memory 245 directly to either slave FIFO 320 or master FIFO 330. In this configuration, buffer memory 245 is accessed in a word mode to achieve the desired bandwidth, i.e., the address and control signals generated by memory read/write sequencer in the direct mode do either a word mode read or a word mode write. Also, the memory address for buffer memory 245 in direct slave mode is derived directly from the address on secondary PCI bus 236.

Preferably, all reads from buffer memory 245 to PCI bus 236 are performed using the direct mode. However, writes to buffer memory 245 can be performed in either the direct mode or the data function mode. As explained above, a direct mode write can be performed directly through multiplexer 443. Alternatively, a direct mode write could be performed by writing zeros in XOR operand register 444 and connecting buffer memory data bus port 455 to terminals 452 that supply the output signal from XOR function circuit 345. In this configuration, data for all writes, either direct or data mode, are streamed to XOR function circuit 345.

The data function mode is useful for RAID parity generation. For RAID 5 applications, the data function is the XOR function. The data function mode preferably is used only for writes to buffer memory 245.

In this embodiment, selected bits from the address on PCI bus 236 are loaded in a DRAM address register 371 in address decode circuit 375 of PCI bus interface circuit 370. The bits selected from the PCI address depends on the size of buffer memory 245. As indicated above, buffer memory 245, in one embodiment, ranges from 1 to 16 Mbytes. In another embodiment, buffer memory could be as large as 256 Mbytes. For a given size, sufficient bits must be selected from the PCI memory address to address each location in buffer memory and to provide additional bits to distinguish between the normal and alias addresses.

The higher order bits of the DRAM address, e.g., the four most significant bits, in DRAM address register 371 are a first input to a comparator 373 in address decode circuit 375. The corresponding number of higher order bits from the alias base address for buffer memory 245 that is stored in an alias DRAM base address register 372 in PCI bus interface circuit 370 are a second input to comparator 373. When the bits from register 371 are equal to or greater than the bits from register 372, an active signal is driven on data function enable line 376 by comparator 373.

The DRAM address supplied to buffer memory controller 340 is generated by the lower order bits in DRAM address register 371 that are not used in determining whether the address is an alias address. The particular bits used to construct the address for buffer memory controller 340 and used to provide input signals for comparator 373 are illustrative only. Those skilled in the art can achieve the two functions in a variety of circuit implementation. One important aspect is that the same location is always addressed in buffer memory 245 independent of whether the direct mode, that uses the normal address, or the data function mode, that uses the alias address, is activated.

For example, if integrated PCI buffer controller and XOR function circuit 265 has a PCI address space allocation of 1100 0000 through 11FF FFFF for direct mode. The PCI address space allocation for the data function mode, i.e., the alias address space, could be 1200 0000 to 12FF FFFF. In this example, an alias address of 1202 1234 would be converted to an address of 02 1234 by address decode circuit 375 and the XOR function would be enabled.

When integrated PCI buffer controller and XOR function circuit 265 is in slave mode, memory read/write sequencer 441 generates a slave mode signal on channel select line 445. In response to the slave mode signal on line 445, buffer circuit 471 passes the DRAM address from register 371 to address select multiplexer 480 over bus 378. (Herein, address select multiplexer 480 is used to clearly demonstrate the source of the address for buffer memory 245. Those of skill in the art will recognize that the functionality provided by multiplexer 480 is typically included within memory read/write sequencer 441.)

In response to the slave mode signal on channel select line 445, address select multiplexer 480 passes the DRAM address on bus 378 to memory read/write sequencer 441. If the address on PCI bus is an alias address, memory read/write sequencer 441 also receives an active signal on data function enable line 376.

In response to the active signal on line 376 and the DRAM memory address from bus 378, memory read/write sequencer 441 performs a read/modify/write sequence. Specifically, in this embodiment, memory read/write sequencer 441 connects buffer memory data bus port 455 to terminals 451 of multiplexer 451 which in turn are connected to XOR operand register 444. While in this embodiment, an XOR operand register 444 is described, this is illustrative only of a storage element, and is not intended to limit the invention to a register. Those of skill in the art will appreciate that XOR operand register 444 could be implemented as a FIFO memory, for example.

Memory read/write sequencer 441 also provides the DRAM address and control signals to buffer memory for a word read from the location in buffer memory 245 indicated by the DRAM address, and clocks the word of data into XOR operand register 444. In this embodiment, a word is four bytes. Alternatively, a page access could be used. The particular method used to store and retrieve data from buffer memory 245 is determined by the type of memory used and the speed requirements for the circuit. The particular method selected for addressing buffer memory 245 is not an essential aspect of this invention.

The data in XOR operand register 444 is a first operand to XOR function circuit 345. The second operand to XOR function circuit is a word of data from slave FIFO 320, i.e., the data that is streaming from PCI bus 236. XOR function circuit 345 performs a word Exclusive OR function on the word from register 444 and the word from slave FIFO 320.

After the data are loaded into XOR operand register 444, memory read/write sequencer 441 generates a signal on mode select line 446 that connects the output signals of XOR function circuit on terminals 452 of multiplexer 443 to buffer memory data bus port 455 so that the data from XOR function circuit is supplied to buffer memory 245. Memory read/write sequencer 441 generates control and address signals to buffer memory 245 so that the data from XOR function circuit 345 is written back to the same location in buffer memory 245 from which the first operand was read using a word write of 32-bits. Word reads and writes of 32-bits are also done for boundary conditions. At a boundary, only the bytes of interest are processed. After the data are written in buffer memory 245, memory read/write sequencer 441 increments the DRAM memory address.

Thus, in the data function mode of operation, two buffer memory cycles are required for each PCI bus cycle. However, since the same address is used for the read and the write to buffer memory 245, one address settling time for buffer memory 245 has been eliminated in this embodiment. Of course, there is no requirement that the XORed data be written back to the same location in buffer memory 245. In this case, both address settling times for buffer memory 245 must be considered.

There are many advantages to the control method of this invention. A data function can be automatically turned on or off by the start of a data transfer. The data function turn-on and turn-off is implicit, and requires no explicit action by the host computer or onboard processors on host adapters. Consequently, no portion of the command execution time is spent managing the data function.

After the SCSI command block has been constructed, neither the host computer processor nor the host adapter processors have anything to do with operation of the XOR function circuit in integrated PCI buffer controller and XOR function circuit 265. Consequently, circuit 265 is completely self-contained, and operates independent of other host adapter devices. No interconnects to other devices in addition to the PCI bus are required for control of the data function. No microprocessor is required on the host adapter to control the data function circuit. No modifications are required to other host adapter hardware devices or their firmware to operate with integrated PCI buffer controller and XOR function circuit 265. Integrated PCI buffer controller and XOR function circuit 265 can simply be added onto the PCI bus, and accessed by other devices as if it were host memory. The data function control circuitry is very simple.

This simplicity and independence contrasts sharply with other prior art alternatives. For example, separate control lines between a host adapter 260A, for example, a device such as integrated PCI buffer controller and XOR function circuit 265 could be used. This, of course, would require additional pins on both circuits for such control lines. The RISC sequencer in host adapter 260A would activate the control lines to turn on or off the data function prior to the data transfer. Additional RISC sequencer firmware and execution time would be required for this method of data function control. Also, integrated PCI buffer controller and XOR function circuit 265 would require redesign in order to use the data function.

Yet another method would require no additional hardware control lines. Immediately prior to each data transfer, the data transfer device could send a control message along the PCI bus to integrated PCI buffer controller and XOR function circuit 265 to tell circuit 265 to turn the data function on or off. Not only would this create a delay in the data transfer, but the RISC processor in the host adapter would have to know the PCI address of the message destination. Currently, such processors have no knowledge of other device addresses, and additional resources would be required for them to gain and store such knowledge.

Integrated PCI buffer controller and XOR function circuit 265 is particularly advantageous for RAID 5 applications. In one embodiment, a RAID manager, executing on the host computer, specifies a sequence of SCSI commands for a RAID 5 write operation. The host adapter system driver in response to the sequence of commands specified by the RAID manager builds a plurality of chained SCSI command blocks to manage the time-sequencing of the execution of the chain of commands contained in the SCSI command blocks. One method for chaining SCSI command blocks is described in commonly filed and commonly assigned U.S. patent application Ser. No. 08/617,990 entitled "A METHOD FOR SPECIFYING A SEQUENCE OF EXECUTION OF I/O COMMAND BLOCKS IN A CHAIN STRUCTURE," of B. Arlen Young, filed on Mar. 15, 1996, Attorney Docket No. M-3804, which is incorporated herein by reference in its entirety.

The SCSI command blocks in a chain each includes a sequencer control block (SCB) such as that described in U.S. patent application Ser. No. 08/269,491, filed on Jun. 30, 1994, entitled "A SCB ARRAY EXTERNAL TO A HOST ADAPTER INTEGRATED CIRCUIT" of Michael D. Brayton et al. and U.S. patent application Ser. No. 08/269,463, filed on Jun. 30, 1994, entitled "METHOD FOR ACCESSING A SEQUENCER CONTROL BLOCK BY A HOST ADAPTER INTEGRATED CIRCUIT" of B. Arlen Young, each of which is incorporated herein by reference in its entirety. The sequencer control blocks are chained together by information added within the sequencer control block, or alternatively appended to the sequencer control block. Sequencer control blocks are illustrative only of an I/O command block and are not intended to limit the invention to the particular blocks described. In view of this disclosure, the principles of this invention can by utilized with any control block to a host adapter system.

Figure 5:
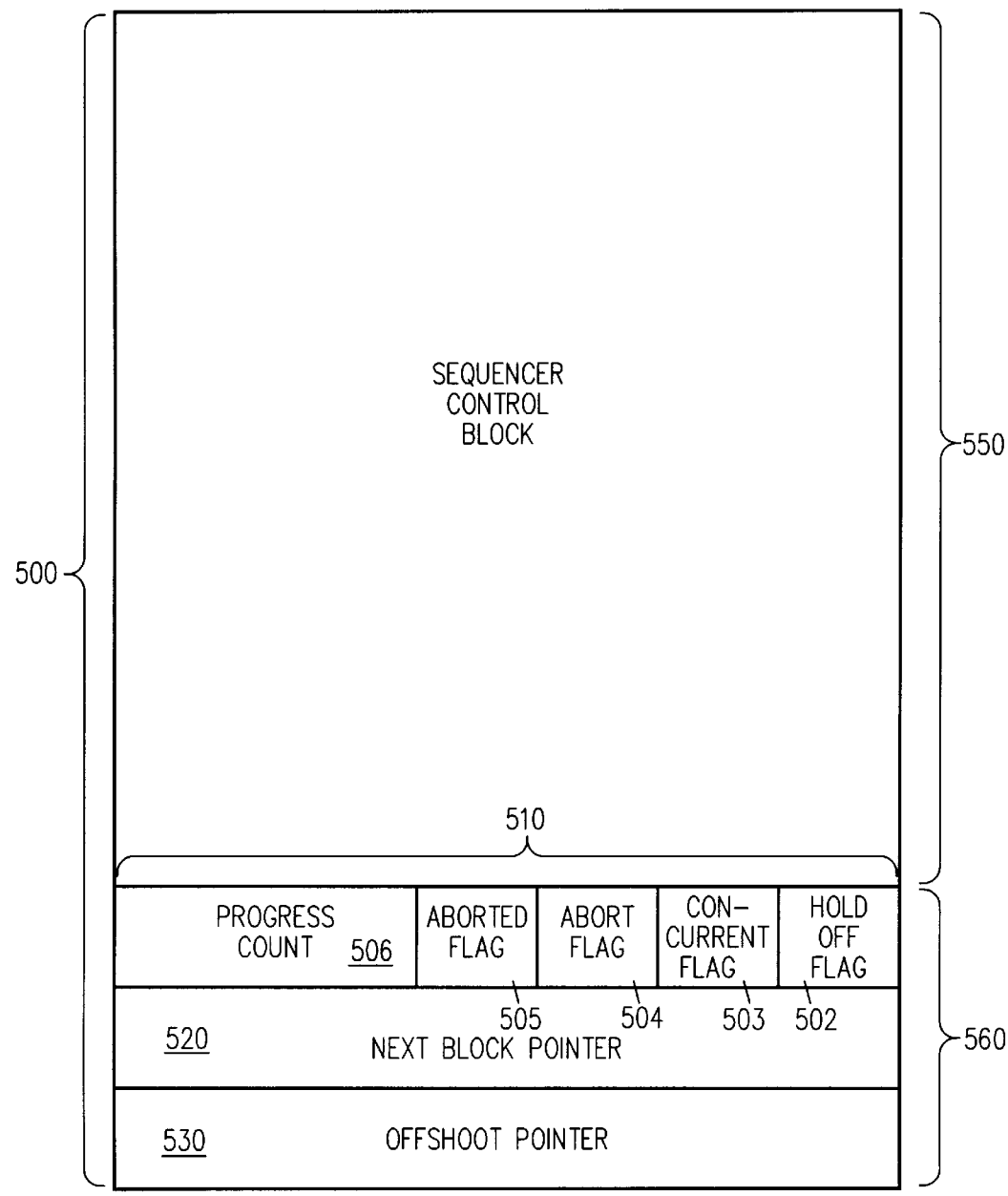
FIG. 5 is an illustration of one embodiment of the architecture of a SCSI command block that is used with this invention.

Briefly, a SCSI command block 500 (FIG. 5) includes the prior art sequencer control block 550 and a chain control block 560 that is used to chain sequencer control block 550 to sequencer control blocks in other SCSI command blocks. Chain control block 560 includes control bits, control counts, and pointers, and in one embodiment is contained in three bytes that are appended to sequencer control block 550. The three bytes are a chain control byte 510, a next block pointer byte 520, and an offshoot block pointer byte 530.

Chain control byte 510 of SCSI command block 500 includes a holdoff flag 502, a concurrent flag 503, an abort flag 504, an aborted flag 505, and a progress count 506. The sequencer control block is executed in a manner that is similar to execution of prior art unchained sequencer control blocks. However, some additional firmware may be included to allow aborting a SCSI command block in the chain.

Upon completion of execution of the sequencer control block, the RISC sequencer executes a chain control process, i.e., a chain manager, that may enable start of execution of the next SCSI command block; that may post completion of the chain; or that may simply decrement the progress count in a following SCSI command block on the chain path, and return to an idle loop. A more detailed description of the chain control process in presented in U.S. patent application Ser. No. 08/269,463 entitled "METHOD FOR ACCESSING A SEQUENCER CONTROL BLOCK BY A HOST ADAPTER INTEGRATED CIRCUIT," of B. Arlen Young, and that description is incorporated herein by reference.

The particular aspects of the chain control process are not essential to this invention, because the invention also provides a performance advantage for unchained SCSI command blocks. Thus, in the following description, the operation of integrated PCI buffer controller and XOR function circuit 265 is described without the specific details of controlling the sequence of RAID 5 operations through chaining.

Figure 6:
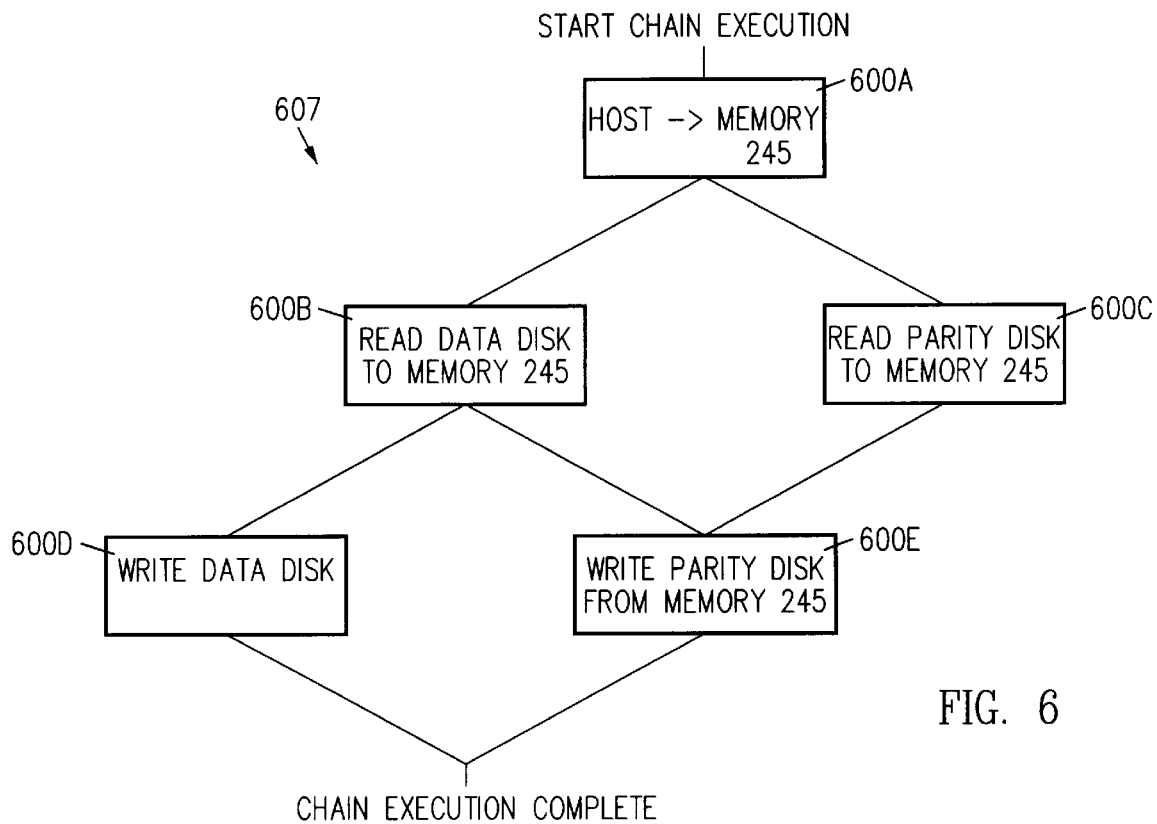
FIG. 6 is an execution flow diagram of a chain that accomplishes a RAID 5 write operation using the integrated buffer controller and XOR function circuit of this invention.

FIG. 6 is an execution flow diagram of a chain 607 of SCSI command blocks that accomplishes a RAID 5 write operation. As shown in FIG. 6, SCSI command block 600A includes instructions for a SCSI write transfer from the host computer memory to buffer memory 245. SCSI command block 600B includes instructions for a SCSI read transfer from a disk connected to one of host adapters 260A to 260C to buffer memory 245. A PCI alias address is specified for buffer memory 245 in SCSI command block 600B so that an Exclusive OR of the data in buffer memory 245 and the data from the disk is generated by circuit 265. SCSI command block 600C also includes instructions for a SCSI read transfer from a disk to buffer memory 245. The PCI alias address is specified for buffer memory 245 in SCSI command block 600B so that an Exclusive OR of the data in buffer memory 245 and the data from the disk is generated by circuit 265. SCSI command block 600E includes instructions for a SCSI write transfer of the parity data generated as a result of the execution of blocks 600A to 600C from buffer memory 245 to a disk. SCSI command block 600D includes instructions for a SCSI write transfer of the new data to the target disk drive. This SCSI write transfer could be either from buffer memory 245 or the host computer memory.

Table 1 gives the state of SCSI command blocks 600A to 600E when chain 607 is built by host adapter driver 205 and loaded in shared memory 255 for host adapters 260A to 260C and PCI buffer controller and XOR function circuit 265.

TABLE 1

STATE OF CHAIN CONTROL BLOCK FOR INITIATION OF A RAID 5 WRITE SEQUENCE

| SCSI CMD BLK | Progress Count | Concurrent Flag | Holdoff Flag | Next Blk Ptr | Offsht Blk Ptr |
|---|---|---|---|---|---|
| 600A | 1 | 0 | 0 | 600B | 600A |
| 600B | 1 | 1 | 1 | 600C | 600D |
| 600C | 15 | 0 | 1 | 600E | 600C |
| 600D | 2 | 0 | 1 | 600D | 600D |
| 600E | 2 | 0 | 1 | 600D | 600E |

SCSI command block 600A is at the head of chain 607, and is enabled to execute by the host adapter system driver because holdoff flag 602A is reset. The holdoff flags in SCSI command blocks 600B to 600D are initially set. After the host adapter system driver builds chain 607, the driver transfers chain 607 to memory 255 and places pointers to the appropriate blocks in the chain in the queue-in FIFOs of host adapters 260A to 260C and circuit 265. In this embodiment, a pointer to SCSI command block 600A is placed in the queue-in FIFO of circuit 265 and SCSI command blocks 600B to 600D are placed the appropriate queue-in FIFOs of host adapters 260A to 260C.

RISC sequencer 390 in circuit 265 initiates execution of SCSI command block 600A. Specifically, RISC sequencer 290 configures DMA controller 310 for the master mode so that circuit 265 operates as a PCI master in the transfer of data from the host computer memory to buffer memory 245 over master data channel 331.

RISC sequencer 390 also configures memory read/write sequencer 441 so that memory read/write sequencer 441 configures multiplexer 442 and multiplexer 443 so that the data are transferred from master data channel 331 directly through buffer memory controller 340 to buffer memory 245. Specifically, RISC sequencer 390 retrieves the initial buffer memory address from the current SCSI command block and provides that address to read/write sequencer 441. Since circuit 265 is operating in the direct mode, the PCI address specified in SCSI command block 600A as the destination address contains the address for buffer memory 245.

Read/write sequencer 441, in this embodiment, includes an address decoder similar to that described above in PCI bus interface circuit 370. Using this address decoder, read/write sequencer 441 determines whether the buffer memory address is an alias address or a normal address and generates the appropriate signal on mode select line 446 for master mode operations. In another embodiment, a single address decoder is used in both PCI bus interface circuit 370 and read/write sequencer 441.

As indicated above, sequencer 390 also loads the total number of bytes to be transferred into memory read/write sequencer 341. Sequencer 390 also initializes DMA controller 301 in master data channel 331, as described above. Memory read/write sequencer 441 manages the address for buffer memory 245 during the data transfers and stops the transfer at the total number of bytes. This initial data transfer executes at maximum PCI bus speed.

When the data transfer from host computer memory to buffer memory 245 is complete, SCSI command blocks 600B and 600C are enabled for execution by RISC sequencer 390 and RISC sequencer 390 enters an idle loop. The host adapter that executes SCSI command block 600B is the master of the data transfer from the disk to buffer memory 245. Accordingly for this transfer, slave data channel 321 is utilized for the data transfer to buffer memory 245.

As the data are read in response to the read command in SCSI command block 600B and transferred to circuit 265 an alias PCI address for buffer memory is specified. Thus, when the selected bits of the alias PCI address are loaded in DRAM address register 371, the higher order bits of the address in DRAM address register 371 are greater than or equal to the higher order bits of the alias base address in alias DRAM base address register 372. Consequently, comparator circuit 373 generates an active signal on data function enable line 376 to buffer memory controller 340 to indicate that buffer memory controller 340 is to operate in the data function mode.

Thus, memory read/write sequencer 441 performs the read/modify/write sequence in writing the transferred data to buffer memory 245, as described above. Thus, hardware XOR function circuit 345 in circuit 265 combines the data in memory 245 with the read data in an Exclusive OR function (XOR) and writes the result of the Exclusive OR function back to memory 245.

The operations for SCSI command block 600C are the same as the for 600B with a different source of the read data and so the description of those operations is not repeated. When the read transfers in SCSI command blocks 600B and 600C are both complete, the new parity data for the new data are stored in buffer memory 245.

When SCSI command block 600E is executed, the new parity data are written from buffer memory 245 to the appropriate disk drive. The host adapter that executes SCSI command block 600E is the master of the data transfer from buffer memory 245 to the disk drive. Accordingly for this transfer, slave data channel 321 is utilized for the data transfer from buffer memory 245.

However, since the data function is not needed, the actual address is specified for the location in buffer memory 245. Consequently, the signal on data function enable line 376 is inactive, and buffer memory controller 340 operates in the direct mode. Data are transferred directly from buffer memory 245 to slave FIFO 320, as described above.

When SCSI command block 600D is executed, the new data are written from either buffer memory 245, or host computer memory to the appropriate disk drive. The host adapter that executes SCSI command block 600D is the master of the data transfer. If the data transfer is from buffer memory 245 to the disk drive, the data transfer is similar to that just described for SCSI command block 600E, but the data will have been cached initially in a different location in buffer memory 245. Accordingly for this transfer, slave data channel 321 is utilized in the direct mode for the data transfer from buffer memory 245.

Again, since the data function is not needed, the actual address is specified for the location in buffer memory 245. Consequently, the signal on data function enable line 376 is inactive, and buffer memory controller 340 operates in the direct mode. Data are transferred directly from buffer memory 245 to slave FIFO 320, as described above, and then to the specified disk drive.

Normally, a RAID 5 read operation is done through execution of a single SCSI read command to the data target. In the event that a normal RAID 5 read fails, the redundancy in the stripe across all RAID 5 targets must be used to recover the data lost on the failing target. The data from all drives is XORed together, and the result is recovered data, which is transferred to the host buffer.

Figure 7:
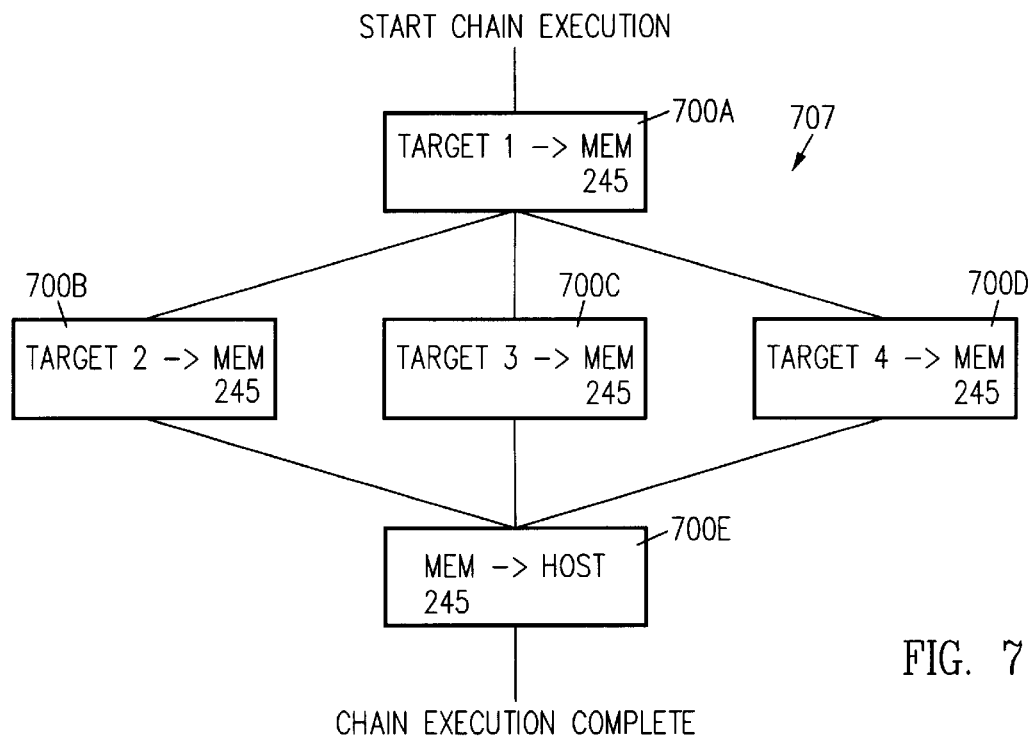
FIG. 7 is an execution flow diagram of a chain of this invention that accomplishes a RAID 5 read operation with a bad data target using the integrated buffer controller and XOR function circuit of this invention.

The sequence of SCSI command block execution for such an operation is a chain of SCSI command blocks 707. In this example, the RAID array has five targets, one of which has been identified as bad. FIG. 7 is an execution flow diagram for chain 707 that accomplishes a RAID 5 read operation with a bad data target.

As shown in FIG. 7, SCSI command block 700A includes instructions for a SCSI read transfer from a SCSI target to buffer memory 245. Since this is the initial transfer, the actual PCI address is used as the destination address. SCSI command block 700B includes instructions for a SCSI read transfer from the disk to buffer memory 245. Since an Exclusive OR of the data in buffer memory 245 and the data from the disk is desired, an alias PCI address is used as the destination address. Similarly, SCSI command blocks 700C and 700D each include instructions for a SCSI read transfer from a disk to buffer memory 245 and include the alias PCI address. SCSI command block 700E includes instructions for a read transfer of the reconstructed data generated as a result of the execution of blocks 700A to 700D from buffer memory 245 to the host computer memory.

Table 2 gives the state of SCSI command blocks 700A to 700E when chain 707 is built by the host adapter system driver and loaded in shared memory 255 for host adapters 260A to 260C and PCI buffer controller and XOR function circuit 265.

TABLE 2

STATE OF CHAIN CONTROL BLOCK FOR INITIATION OF A RAID 5 READ SEQUENCE WITH A BAD TARGET

| SCSI CMD BLK | Progress Count | Concurrent Flag | Holdoff Flag | Next Blk Ptr | Offsht Blk Ptr |
|---|---|---|---|---|---|
| 700A | 1 | 0 | 0 | 700B | 700A |
| 700B | 1 | 1 | 1 | 700C | 700B |
| 700C | 15 | 1 | 1 | 700D | 700C |
| 700D | 15 | 0 | 1 | 700E | 700D |
| 700E | 3 | 0 | 1 | 700E | 700E |

After the host adapter system driver builds chain 707, host adapter driver 205 transfers chain 707 to memory 255 and places pointers to the appropriate blocks in chain 707 in the queue-in FIFOs of host adapters 260A to 260C and circuit 265. In this embodiment, a pointer to SCSI command block 700E is placed in the queue-in FIFO of circuit 265, and pointers to SCSI command blocks 700A to 700D are placed in the appropriate queue-in FIFOs of host adapters 260A to 260C.

The execution of the various blocks is similar to that described above and so is not described in further detail. For block 700A, circuit 265 functions in the direct slave mode, while for blocks 700B to 700D, circuit 265 functions in the data function slave mode. For block 700E, circuit 265 functions in the direct master mode.

A bad target in a RAID 5 array is replaced with a good target. The new good target must be initialized with the data formerly residing in the bad target. The data are reconstructed for the new target again using the redundancy of the RAID 5 stripe across the original good targets. The chain and its execution sequence are exactly the same as for recovering the data from a bad target, except instead of transferring the recovered data to the host, it is transferred to the new target. Therefore, the operation performed by SCSI command block 700E is changed from a buffer memory 245 to host computer memory transfer to a buffer memory 245 to SCSI target transfer. Everything else remains the same.

In the above examples, specific data was initially written to buffer memory 245 and the data function mode of circuit 265 was utilized when an Exclusive OR function was required. However, performance can be enhanced by initialing an area in buffer memory 245 to zero. When the area in buffer memory 245 is initialized to zero, all data transfers from SCSI devices can be initiated concurrently and written to buffer memory 245 using the data function mode of circuit 265. Thus, the initial data transfer in the direct mode that effectively initializes the area of buffer memory 245 is no longer required.

As indicated above, integrated PCI buffer controller and XOR function circuit 265 includes firmware for sequencer 390 to cause circuit 265 to initialize an area of buffer memory 245 to zero. Specifically, zero is written to a pattern register 491. Next, sequencer 390 provides buffer memory controller 340 with the starting address in buffer memory 245 and the size of the transfer. Sequencer 390 selects a master mode transfer and so the buffer memory address from memory read/write sequencer 441 is passed through address select multiplexer 480. Also, the zero from the pattern register is written in the direct mode to memory 245 by buffer memory controller 340 through multiplexers 442 and 443, and so initializes the area in buffer memory 245 to zero.

There is no data transfer across the host computer bus or secondary PCI bus 236 associated with this transfer.

Another vendor specific command is a check zero command. In response to this command, sequencer 390 configures buffer memory controller 340 to scan an entire area in buffer memory 245 and confirm that each byte is zero.

The check zero command is useful in verifying the parity of a RAID 5 stripe. In this process, initially, command write zero is used to initialize an area of buffer memory 245 to zero. Read commands with an alias destination address for buffer memory 245 are issued to all SCSI targets, both data and parity, on the RAID 5 stripe. Thus, as the stripe is transferred from the SCSI target to buffer memory 245, integrated PCI buffer controller and XOR function circuit 265 is in the slave data function mode. Consequently, the data from the SCSI target is passed through Exclusive OR function circuit 345 and combined by the Exclusive OR function with the data in the area of buffer memory that was initially set to zero.

If the stripe parity is valid, when all data transfers have completed, the buffer area contains only zeros. Command check zero is used to verify that the area of buffer memory 245 contains only zeros.

In response to command check zero, sequencer 390 again loads the pattern register with zero. Sequencer 390 also provides buffer memory controller 340 with the starting address of the area in buffer memory 245 and the length of the area. Buffer memory controller 340 uses the data function read/modify/write process to verify the area in buffer memory 245. The zero in pattern register 491 is the second operand to XOR function circuit 345 and the data from memory 245, i.e., a unit of data is loaded in XOR operand register 444, i.e., loaded in a storage element. The output signal from Exclusive OR function circuit 345 is checked by hardware for a zero value, e.g., the output of Exclusive OR function is connected to a clock terminal of a register. If a non-zero location is detected, the rising edge clocks the register so that a status byte is set to a predetermined non-zero value. Since this check is done automatically with only hardware in buffer memory controller 340, the check is performed rapidly in comparison to using sequencer 390 to read each byte and perform the comparison, for example.

The hardware Exclusive OR function is used in this embodiment, because this data function is available. However, this process works with any logic function that has a unique output signal for two logic zero input signals and a different output signal for one logic zero input signal and one logic one input signal, i.e., the logic function has a unique output signal for two logic zero input signals. Also, the unit of data checked can be a byte, or a word, where a word can be 2, 4 or 8 bytes for example. Further, a page of data could be retrieved from buffer memory 245 and stored in a data FIFO storage element, and then checked a unit of data at a time.

The above embodiment of this invention are illustrative only of the principles of this invention and is not intended to limit the invention to the specific embodiment disclosed. In view of this disclosure, the data function circuit and the method for selectively enabling the data function circuit can be used in a wide variety of applications.

I claim:

1. A method for enabling and disabling a data function circuit in an integrated circuit having a computer bus port comprising:

applying to said computer bus port one of a first address in a first set of addresses for said integrated circuit, and a second address in a second set of addresses for said integrated circuit;

disabling said data function circuit in said integrated circuit in response to said first address being applied to said computer bus port; and enabling said data function circuit in said integrated circuit in response to said second address being applied to said computer bus port;

wherein said first set of addresses define a first address space for said integrated circuit; and said second set of address define a second address space for said integrated circuit.

2. A method for enabling and disabling a data function circuit in an integrated circuit having a computer bus port as in claim 1 wherein said first and second set of addresses are for a memory and said first set of addresses define storage locations in said memory.

3. A method for enabling and disabling a data function circuit in an integrated circuit having a computer bus port as in claim 2 further comprising:

storing data in said memory at said one address in said first set of addresses.

4. A method for enabling and disabling a data function circuit in an integrated circuit having a computer bus port as in claim 2 further comprising:

converting said one address in said second set of addresses to a corresponding address in said first set of addresses.

5. A method for enabling and disabling a data function circuit in an integrated circuit having a computer bus port as in claim 4 further comprising:

storing the output of said data function in said memory at said corresponding address.

6. A method for enabling a data function circuit in an integrated circuit having a computer bus port comprising;

applying an address to said computer bus port;

determining in which of a normal address space and an alias address space said address is located; and enabling a data function circuit in said integrated circuit only when said address is located in said alias address space.

7. A method for enabling and disabling a data function circuit in an integrated circuit having a computer bus port as in claim 6 further comprising;

storing data at a location in memory defined by said address when said address is in said normal address space.

8. A method for enabling and disabling a data function circuit in an integrated circuit having a computer bus port as in claim 7 further comprising;

storing data at a location defined by an address in said normal address space when said address is in said alias address space wherein said address in said normal address space is generated using said alias address.

9. A method for enabling and disabling a data function circuit in an integrated circuit having a computer bus port as in claim 6 wherein said data function circuit is an Exclusive OR function circuit.

10. A method for enabling and disabling a data function circuit in an integrated circuit having a computer bus port as in claim 6 wherein applying said address comprises applying a PCI address.

11. A method for enabling and disabling a data function circuit in an integrated circuit having a computer bus port as in claim 6 wherein said integrated circuit is a buffer memory controller integrated circuit.

12. A method for enabling and disabling a data function circuit in an integrated circuit having a computer bus port as in claim 1 wherein said data function circuit is an Exclusive OR function circuit.

13. A method for enabling and disabling a data function circuit in an integrated circuit having a computer bus port as in claim 1 wherein said first address space and said second address space are within a PCI address space.

14. A method for enabling and disabling a data function circuit in an integrated circuit having a computer bus port as in claim 1 wherein said integrated circuit is a buffer memory controller integrated circuit.

* * * * *